(12) United States Patent
Seifert (10) Patent No.: US 6,595,373 B1
(45) Date of Patent: Jul. 22, 2003

(54) WEDGE WIRE AND PAPER STOCK SCREENING APPARATUS INCORPORATING SUCH WEDGE WIRE

(75) Inventor: Peter Seifert, Middletown, OH (US)

(73) Assignee: Kadant Black Clawson, Inc., Middletown, OH (US)

( * ) Notice: Subject to any disclaimer, the term of this patent is extended or adjusted under 35 U.S.C. 154(b) by 0 days.

(21) Appl. No.: 09/806,281

(22) PCT Filed: Oct. 5, 1999

(86) PCT No.: PCT/US99/23191

§ 371 (c)(1),
(2), (4) Date: Mar. 28, 2001

(87) PCT Pub. No.: WO00/20091

PCT Pub. Date: Apr. 13, 2000

Related U.S. Application Data (60) Provisional application No. 60/103,413, filed on Oct. 6, 1998.

(51) Int. Cl.[7] .............................. B01D 29/44; B07B 1/20
(52) U.S. Cl. ........................ 210/488; 210/498; 209/393
(58) Field of Search ........................... 210/488, 497.01, 210/498, 499; 209/393, 394, 395; 162/251, 261

(56) References Cited

U.S. PATENT DOCUMENTS

| | | | |
|---|---|---|---|
| 2,301,514 A | 11/1942 | Brewster | |
| 4,193,503 A | 3/1980 | Connolly | |
| 4,267,053 A | 5/1981 | Hashino et al. | |
| 5,011,065 A | 4/1991 | Musselmann | |
| 5,090,721 A | * 2/1992 | Lange | 209/411 |
| 5,234,550 A | * 8/1993 | Ekholm et al. | 162/251 |
| 5,255,790 A | 10/1993 | Einoder et al. | |
| 5,472,095 A | * 12/1995 | Malm | 209/303 |
| 5,618,424 A | * 4/1997 | Nagaoka | 210/402 |
| 5,626,235 A | 5/1997 | Aikawa | |
| 5,791,495 A | 8/1998 | Gero et al. | |

FOREIGN PATENT DOCUMENTS

| | | |
|---|---|---|
| CA | 1148119 | 6/1983 |
| WO | WO 99/50019 | * 10/1999 |

OTHER PUBLICATIONS

Brochure of J&L OptiGuard CSC *Continuous Slotted Cylinders*.

* cited by examiner

*Primary Examiner*—Matthew O. Savage
(74) *Attorney, Agent, or Firm*—Wegman, Hessler & Vanderburg (57) ABSTRACT

A wedge wire for use in a wire type screen for screening papermaker's stock is formed with an elongated body (12) having an enlarged head (20) at the inlet surface of the screen. The head (20) is formed with tapered walls (30, 33) that cooperate to define grooves (28) at the inlet surface between adjacent elements including an upstream wall (30) and a downstream wall (33). A radiused protuberance or projection (37) defines one wall of a screening slot (15), with a wall surface (22) of an adjacent wedge wire element. The slot wall formed by the projection (37) is free of sharp edges and is limited in length, in the direction of flow through the slot (15), not substantially exceeding the gap width of the slot. The upstream wall (30) defining the groove (28) provides protection for the slot (15) against impact and damage by contaminants that may be contained in the papermaker's stock. The slot (15) is free of sharp corners so as not to impede flow through the slot.

2 Claims, 6 Drawing Sheets

WEDGE WIRE AND PAPER STOCK SCREENING APPARATUS INCORPORATING SUCH WEDGE WIRE

CROSS REFERENCE TO RELATED APPLICATIONS

Priority filing benefit of (1) International PCT application PCT/US99/23191 filed Oct. 5, 1999, and published under PCT 21(2) in the English language and (2) U.S. provisional application Ser. No. 60/103,413 filed Oct. 6, 1998.

BACKGROUND OF THE INVENTION

This invention relates to an improved wedge wire for use in the making of screens for screening suspensions of papermaker's stock and also to a screen incorporating such a wedge wire.

Apparatus for screening a suspension of papermaker's stock that use closely spaced bar or wire elements to define screening slots is shown in Martin U.S. Pat. No. 4,267,053 issued May 12, 1981 as an example. The individual wire elements are generally identical to each other in structure are drawn or extruded from metal such as stainless steel and are supported closely spaced relation to each other to define screening slots. The wire elements may extend circumferentially as in the case of a cylindrical screen, or parallel to the screen axis, or any combination of these orientations.

The screening apparatus in which wedge wire screens are used are commonly known as pressure screens in which a stock suspension to be screened or sorted is applied under positive pressure to an inlet of a closed vessel incorporating such a screen. Turbulence-inducing vanes move along the inlet or the outlet screen surface in close relation to the surface and form pulsation waves to prevent the blocking of the screen slots by the material being screened.

Typically a wedge wire is formed with an enlarged upstream end in relation to the direction of flow through the slot formed by the wedge wire. The wire body narrows down at the downstream end so as to present a wedge-like shape in cross section. The individual wedge wires are oriented parallel to or adjacent to each other and are separated by a small defined distance thereby forming screening slots between adjacent wires. The wires are oriented such that the material to be screened enters through slots as defined at the enlarged ends of the wires which together form a screen with a contoured inlet surface.

Typically wedge wires have been formed with flat or planar surfaces joined at relatively sharp corners positioned at the entrance of the screening slot. The direction of the mass flow of the stock being screened is in a direction substantially parallel to the screen inlet surface and therefore at a substantial angle to the flow axis of the slot. The rate of this flow along the screen inlet surface may be at relatively high velocities of about 3,000 feet per minute or more.

The efficiency of the screen in terms of throughput depends on a number of factors but for any given slot width the throughput capacity is substantially limited by the geometry of the slots that are formed by the juxtaposed surfaces of the wires themselves. Abrupt corners presented to the stock suspension at the inlet surface by the wedge wires require the fluid to bend sharply in direction around the wire corners in order to enter the slot. This consumes energy and effectively restricts the rate of flow in such screens.

Further wedge wires commonly do not sharply define and limit the effective length of the slot in the flow direction through the slot and create virtual slots that extend unnecessarily far along the depth of the wires thereby increasing the pressure drop and limiting the flow rate through the screen.

In many wire type screen designs the screening slot is unprotected from direct impact of contaminants in the stock suspension moving in the mass flow rapidly along the inlet surface of the screen. Such impacts cannot only cause premature and rapid wear of the slot, resulting in slot widening, but also can physically damage the slot. It is therefore important that the wedge wire design is one that provides protection for the screening slot. It is also important that the design is one that establishes micro-vortices in the groove area between the slots to assist in the carrying away of rejected particles from the slot back into the main body or flow of the slurry in the pressure screening apparatus for ultimate rejection.

SUMMARY OF THE INVENTION

This invention relates to an improved wire element for screening papermaker's for screening or for sorting a suspension of papermaker's stock in a bar or wire screen also known as a wedge wire screen and also relates to a screen employing such elements for screening or sorting suspensions of papermaker's stock. More particularly the invention is directed to improvements in the shape of the wire element such that an upstream surface is formed which hides or protects the screening slot a downstream surface provides for the establishment of micro vortex flow within the groove for carry away rejected particles and at least one of the wall surfaces of the wire element cooperates with an opposing wall surface of an adjacent wire element to define the slot width and the effective slot length measured in the direction of movement through the slot. Further the elements provide an entrance and exit from the slot that is free of sharp corners so as not to impede or restrict the flow of the stock suspension through the screen.

In the improved wire element shape when the wires as assembled in a screen present a profile at the inlet side of the screen in the form of grooves defined by upstream and downstream surfaces of the wires i.e., upstream or downstream of the direction of tangential flow along the inlet surface. These profile grooves have an upstream planar surfaces inclined opposite to the direction of flow by about 20° to 40° with respect to a reference line which reference line may be a radius line in a cylindrical screen or a median line extending through the slot. The grooves are further defined by downstream surfaces inclined about 40° to 80° in the direction of flow with respect to such radius or median line.

The slot entry itself is formed by adjacent upstream and downstream surfaces of adjacent or neighboring wire elements. At this region, these surfaces assume an approximately radial orientation or an orientation parallel to a median line through the slot between the surfaces. The transitions from an inclined direction at the inlet surface, to an approximately radial direction are by design, gentle; that is the transitions are formed by relatively large radii on the defining surfaces thereby reducing the pressure necessary to cause flow into the slots between the adjacent screening elements.

At the narrowest cross-section of the slots, at least one of the wall surfaces rapidly diverges from the other to control and minimize the length in the direction of flow of the narrowest portion of the slot to further reduce friction.

More particularly, the wedge wire element shape may be characterized as having an elongated body tapered in the flow direction through the screen with an enlarged upstream end or head in relation to the direction of flow of the stock through the screen and tapering to a smaller end remote from the enlarged end. The body defines over a major portion of its depth generally straight sidewalls leading from the small inner end toward the larger end. The larger end itself is characterized by an upstream plane or surface in relation to the direction of flow of a stock suspension across the surface joining with a downstream surface. The upstream and downstream surfaces join at a common elevated point or region on the head.

The upstream surface is inclined by about between 20° and 40° to a median line through a slot defined between the element and an adjacent such element while the downstream surface is inclined at an angle of about 40° to 80° to such median line. In a case of a cylindrically formed screen the median line may also be a radius or may be parallel to a radius.

One of the tapered body sidewalls is joined with the immediately adjacent top wall by a curved protuberance by which the lower end of the upstream wall is joined to a sidewall with the apex of such curved protuberance extending transversely toward such median line and immediately juxtaposed to the junction of the downstream head surface with the sidewall of an adjacent such element thereby forming a slot of a width defined by the spacing of the elements and an effective length in the direction of flow defined by the juxtaposed surfaces. Preferably the protuberance surface forming one wall of the slot is shaped with a relatively constant radius of curvature causing this surface to slope toward a wall of an adjacent such element (defining the narrowest part screening slot at the apex of the curvature) and then sloping abruptly away from the wall to control the effective working depth of the slot. The element on all surfaces is free of sharp protruding edges and all joining surfaces exposed to the inlet flow are radiused. Accordingly the critical slot defined between the elements is characterized by smoothly contoured entrance and exit walls with the effective slot length being controlled by the radius of curvature of the protuberance. Such protuberances may be arranged on either or both of the side walls that define the slot.

The wedge wire elements according to this invention may be provided with integral spacing bumps and mounted to form a pressure screen in the manner described in the PCT application PCT/US99/06120 filed Mar. 26, 1999. The structure and method by which such wires may be formed and mounted as disclosed in the PCT application are preferred although it is within the scope of the invention to mount the elements in known manners as shown for example, in U.S. Pat. No. 5,472,095 or U.S. Pat. No. 5,618,424.

An object of the invention is the provision of an improved bar design for a wedge wire or bar type screen for screening or sorting a suspension of papermaker's stock characterized by low pressure drop, high efficiency, and long life.

A further object of the invention is the provision of a screen for screening a suspension of papermaker's stock employing a slotted design using individual closely spaced bar elements as outlined above.

These and other objects and advantages of the invention will be apparent from the following description the accompanying drawings and the appended claims.

DETAILED DESCRIPTION OF THE PREFERRED EMBODIMENT

Referring to the figures of the drawing bar elements 10 are shown as having identically shaped bodies 12 rolled or extruded from stainless steel material. Bar elements 10, when positioned in side-by-side relationship, define screening slots 15 therebetween. The screening gaps or slots 15 have of a controlled dimension in width and may be as narrow as three or four thousandths of an inch or as wide as 10 to 20 thousandths of an inch depending upon the purpose for which the screen is utilized or the coarseness of the material or contaminants that may be contained in a suspension of papermaker's stock.

Figure 1:
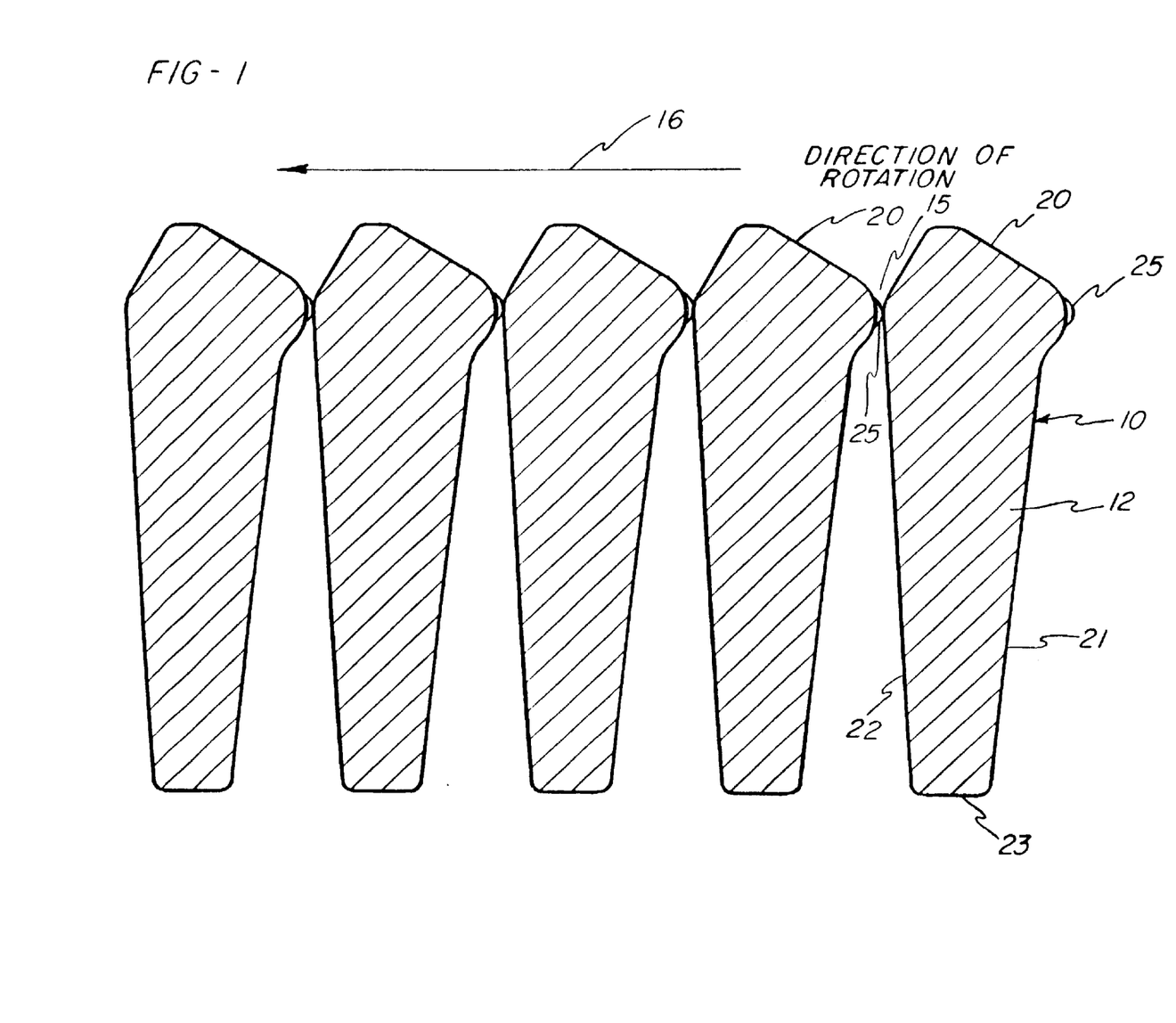
FIG. 1 is an enlarged sectional view showing a plurality of the bar elements according to this invention positioned in side-by-side relationship defining slots therebetween.

The bar elements 10 are preferably mounted and supported in a predetermined relation to each other such as illustrated in FIG. 1, by supporting apparatus and structure which may comprise a cylinder in which the bar elements 10 define the inlet and outlet surfaces of such a cylinder or other screening element. Preferably the bar elements are supported in accordance with the teachings of the above PCT application forming a part of this disclosure. However, it is within the scope of the invention to support the bar elements as in conventional wedge wire type cylinders, as previously noted.

The arrow 16 identifies the direction of rotation of the fluid within the enclosing pressure vessel and adjacent the screen. This direction of rotation is commonly enhanced by a plurality of impulse members, such as foil members or protuberances on a drum type rotor that rotate in the same direction as that of the arrow 16. As a result the stock suspension moves rapidly and under pressure across one side of the screen defined by the members 10, which shall be called the inlet end 20 of the elements 10.

The body 12 of the elements is tapered in the flow direction through the screen slots 15 and has major flanking side walls 21 and 22 terminating in a truncated narrower bottom 23 defining the outlet side of the screen. The bottom 23 is generally welded to embedded in or supported by a support ring such as the ring 84 described in the above PCT application. The inlet ends 20 of the bar elements 10 are preferably secured in the desired position by welds, in the case of a cylinder, by circumferential welds as identified by the reference numeral 20 in the PCT application.

Preferably spacing between the individual elements defining the screening slots 15 is maintained by small protuberances 25 formed at spaced locations along the lengths of the elements 10. The protuberances are accurately formed so as to define a slot 15 of the desired width when the heads or inlet ends of the elements 10 are mounted in position in physically abutting or contacting relation, at the protuberances 25. The protuberances 25 correspond to the bumps or raised areas 14 as described in the PCT application.

However, it is within the scope of this invention to conventionally mount the wires with a fixed or known spacing at the slot 15 such as by using spacer shims during the assembly process which shims are removed after the screen is assembled.

The elongation of the elements 10 in the flow direction through the slots 15, from the outer or inlet ends 20 to the inner end 23, is primarily for the purpose of beam strength as required for the elements. The screening takes place along the undulating surfaces at the heads or inlet ends 20 defined by the assembled elements 10, and at the slots 15.

Figure 2:
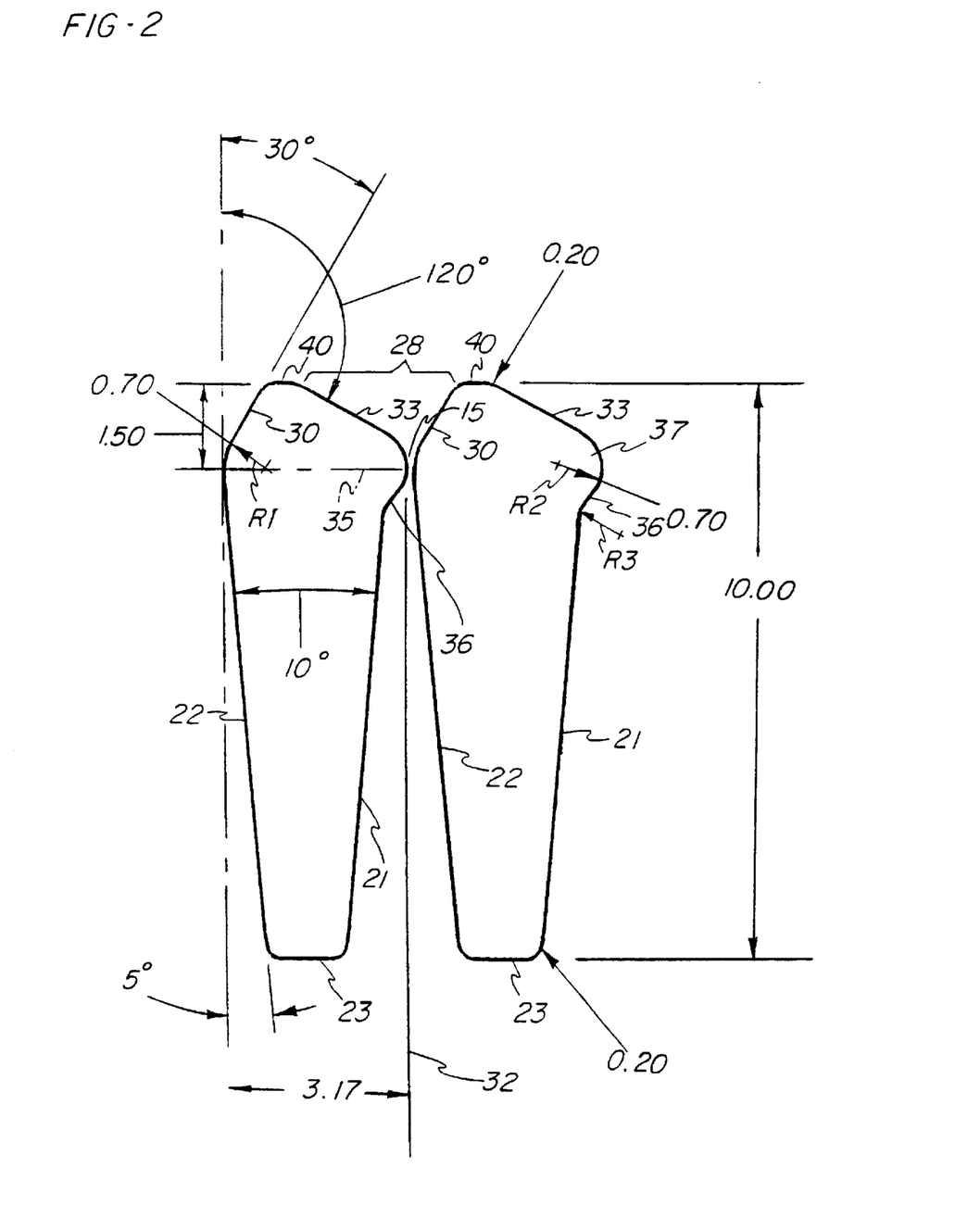
FIG. 2 is a diagram showing two of the bar elements of FIG. 1 in cross section.

Referring more particularly to FIG. 2, the head or end 20, when positioned with an adjacent such element defines an overall wedge wire profile characterized by inlet grooves 28 that extend parallel to the elements. The grooves 28 are formed by respective inlet surfaces of the adjacent elements including upstream generally planer wells or surfaces 30 (i.e. upstream with respect to the slot 15) inclined backward or opposite to the direction of flow or direction of rotation 16 illustrated in FIG. 1. The angles herein are in reference to a median line 32 through the center of the slot 15 which in the case of a cylinder screen may also be considered to be a radius line. The well or surface 30 is inclined by about 20° to about 40° with respect to the median line 32 and is joined to the wall 22 by a gentle radius of curvature and is shown by the radius R1. The opposite walls of the grooves 28 are defined primarily by inclined downstream surfaces 33 of the immediately adjacent elements 10 formed on the enlarged ends of the wire bodies 12. The downstream surfaces 33 are inclined at about 40° to 80° in the direction of flow with respect to the median line 32.

The slots 15 are defined between the radius R1 and a radius R2 joining the surface 33 with the upstream or immediately adjacent inclined wall 22 of the body 12. The terms "upstream" and "downstream" are used in relation to the grooves 28 formed at the inlet surface of the screen by immediately adjacent elements 10.

The radius R2 forms a projection or protuberance 37 and is positioned with a center line providing a smooth transition from the upstream end of the wall 33 through the slot. The narrowest part of the slot is defined by a reference line 35 normal to the line 32. The slot continues inwardly in the direction of flow and widens quickly and substantially below the line 35 at a transition portion 36 with a reverse curvature R3 blending into the upper end of the wall 21. The transition portion 36 provides a rapid opening of the space between adjacent elements 10 at the slot 15 and defines the effective length, in the flow direction of the slot. The narrow slot length in the direction of flow through the slot is intentionally maintained extremely short with a flow length not substantially greater than the width.

All flow encountering surfaces on the heads or inlet ends of the elements 10 are intentionally formed with radiused transitions between straight or planar segments free of any sharp corners.

The wall or surfaces 30 defining the upstream walls of the grooves 28 are effectively steeper than the walls 33. This is intentional to hide the slots 15 and protect the same against impact and damage by heavy or large contaminants that move past or through the grooves 28 at high speed. The speed of rotation of the foils in relation to the inlet surface of a cylindrical screen, may be in the order of 3,000 feet per minute or more and the rate of movement of the fluid suspension may, at times approximate the rate of movement of the foils. At this speed, it is important that the slots 15 be protected against damage.

The inclined surface 33 forming the downstream walls are conducive to forming micro-eddy flows within the grooves 28 and these micro-eddy flows, rotational in nature tend to prevent rejected materials from becoming entrapped within the related groove that might otherwise block the slot 15 and reduce screen capacity.

Figure 3:
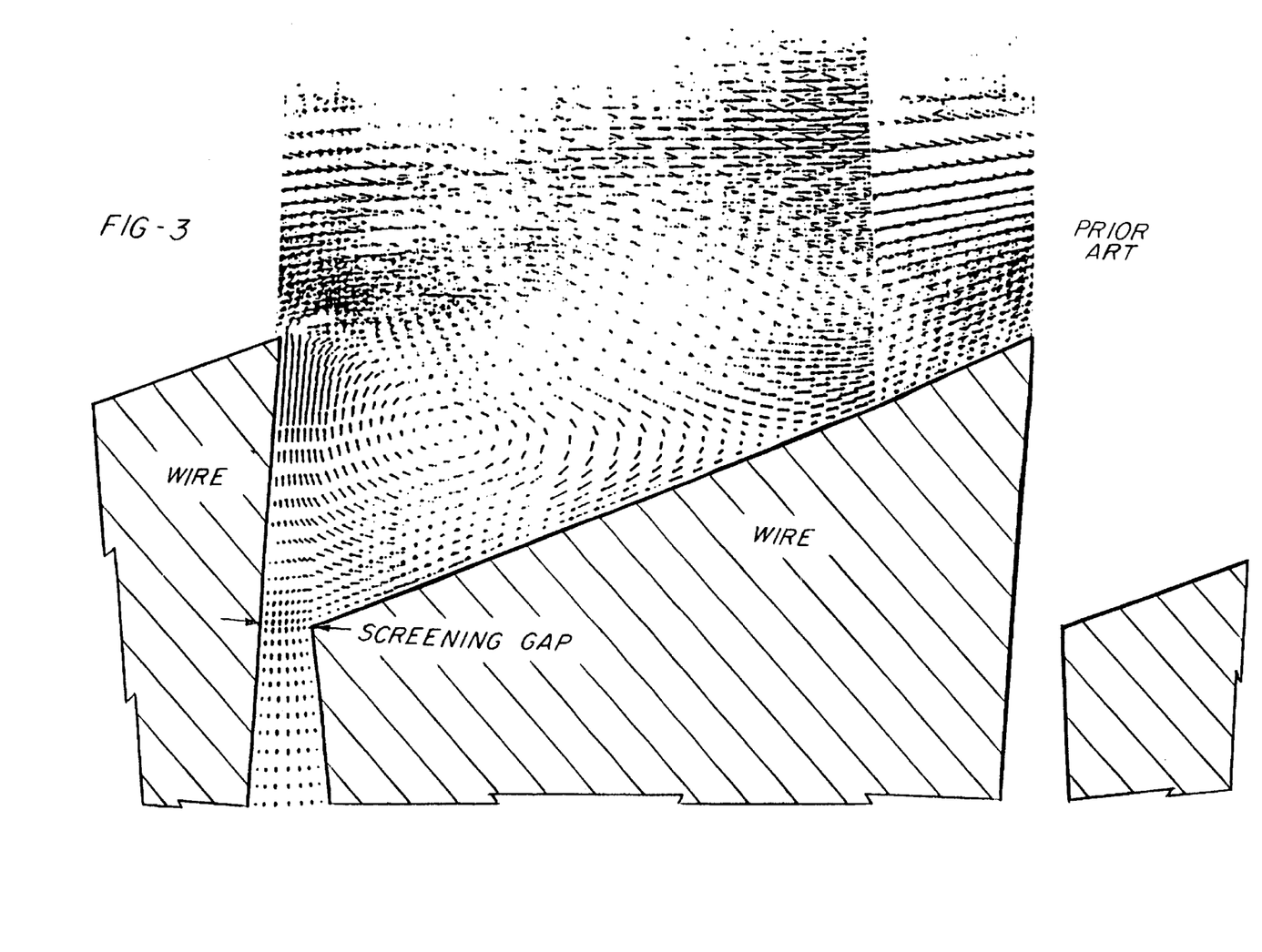
FIG. 3 is a computer generated flow diagram through a conventional slot defined by prior conventional wire elements.
Figure 4:
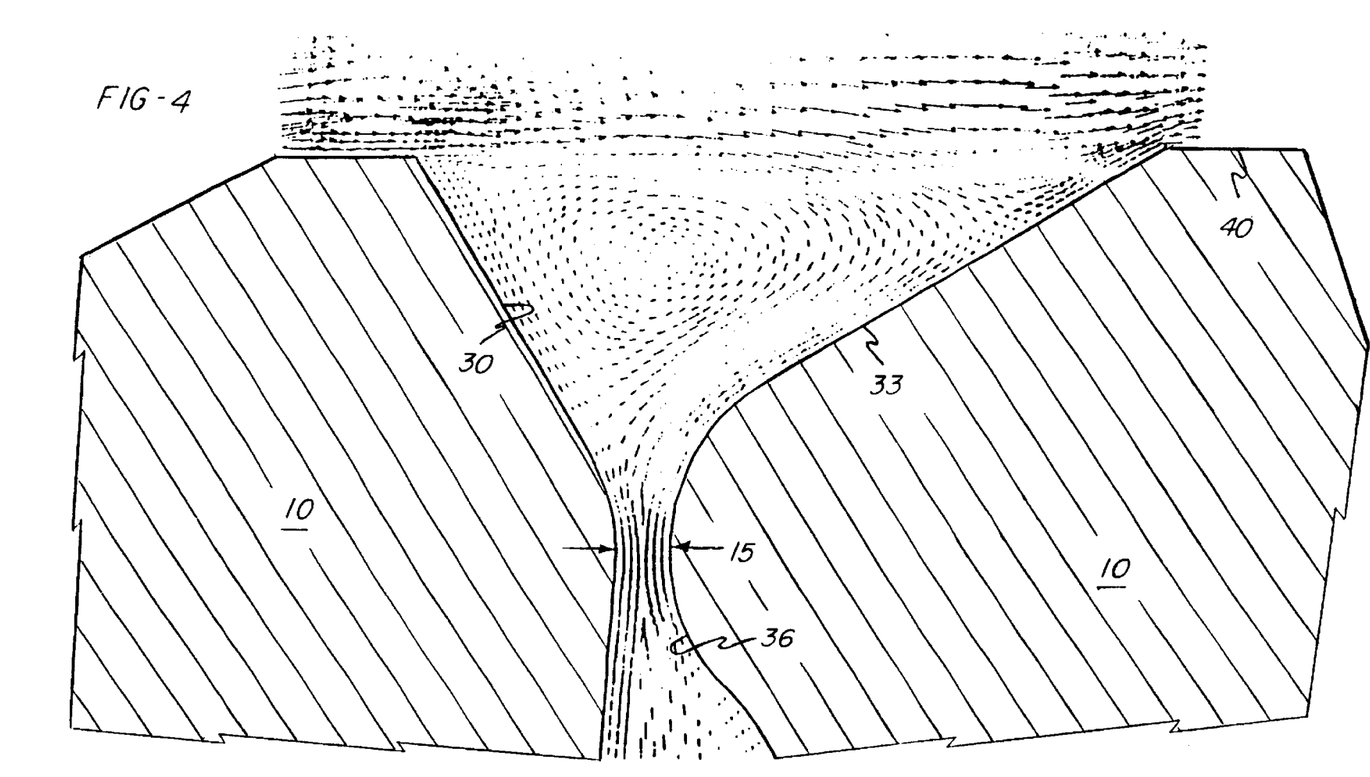
FIG. 4 is a computer generated flow diagram through a slot formed by the wire elements of this invention.

In a typical example, FIG. 2, not intended to limit the scope of the invention the walls 21 and 22 may diverge through an angle of 10° and are inclined 5° to the median line 32. The overall height from the inlet end to the base 23 may be 10 mm. The angle of inclination of the wall 30 to the line 32 is 30° and the wall 33 to the line 32 is 60°. R1 and R2 each have a radius of 0.70 mm. R3 has a radius of 0.40 mm. Reference line 35 is 1.50 mm below the apex 40 of the element. The apex 40 forms a smooth transition between the walls 30 and 33. Two fluid mechanics finite element flow analyses of the prior art conventional profile and of the profile of this invention are shown in FIGS. 3 and 4 respectively. These show calculated flow patterns in the conventional and the new configuration using FIDAP program.

Figure 5:
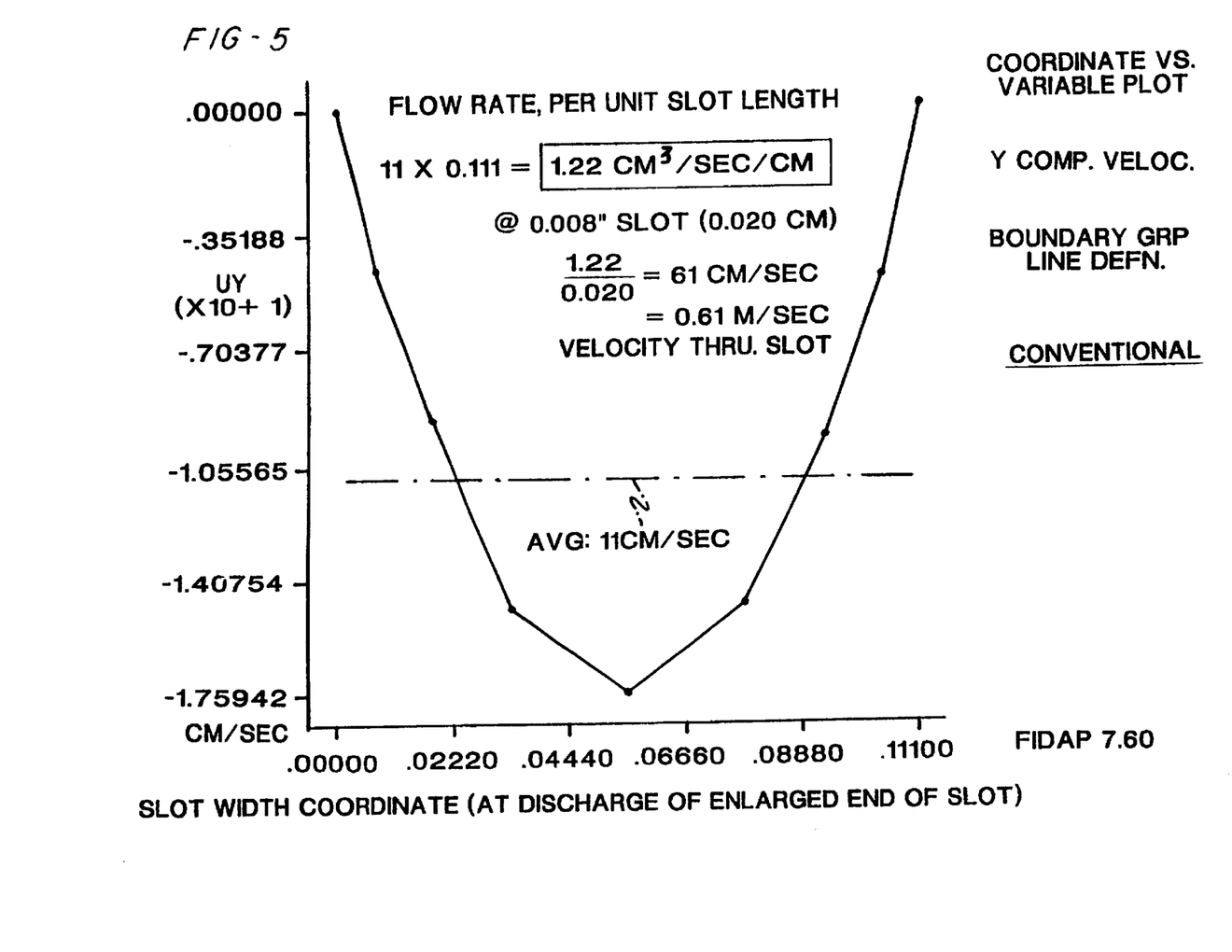
FIG. 5 is a computer generated diagram showing the velocity profile through a conventional slot.
Figure 6:
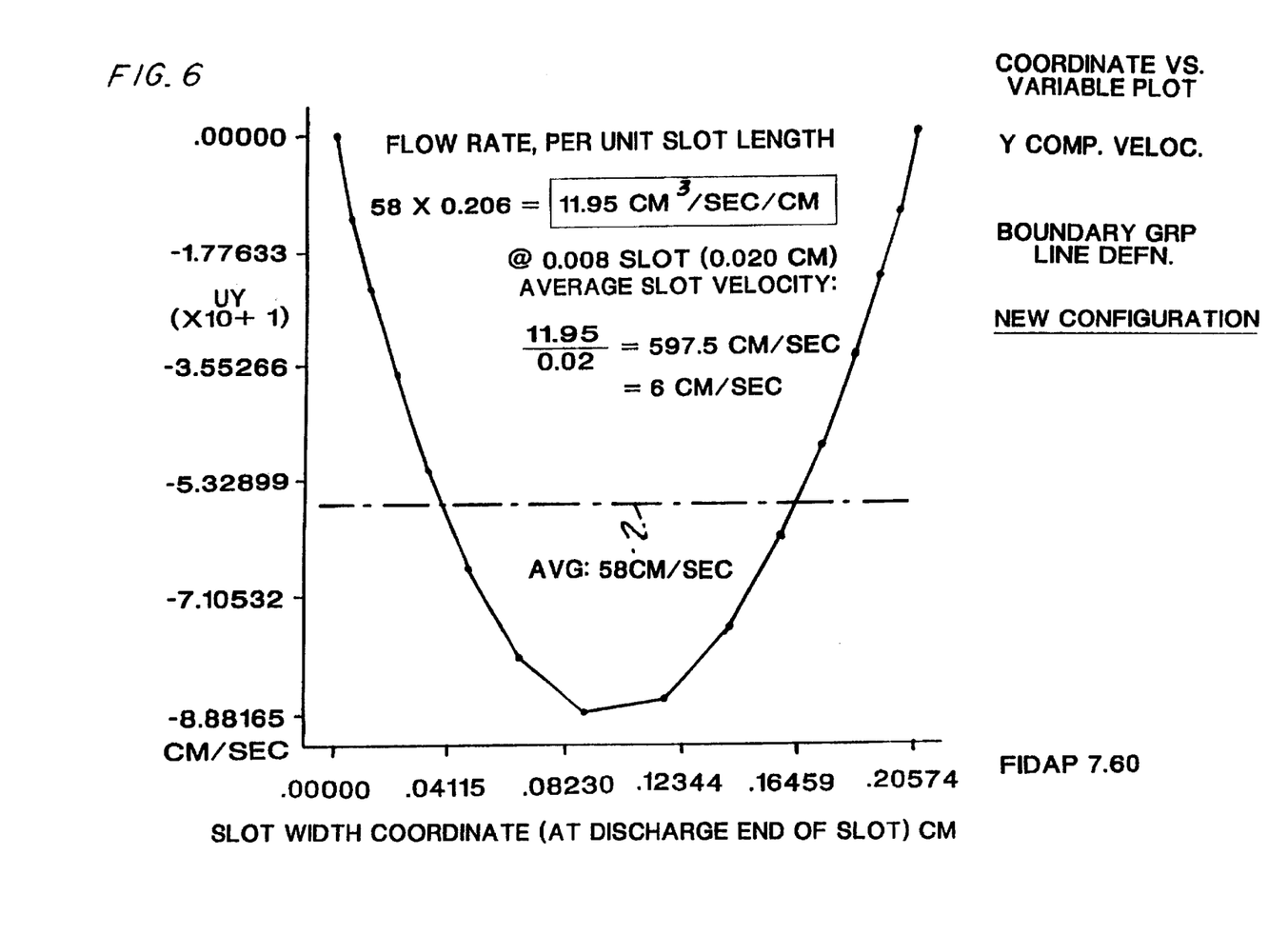
FIG. 6 is a further computer generated diagram showing the velocity profile through a slot using wire elements of this invention.

The computer program also permits one to calculate velocity profiles, at the exit end of the slot. These are shown in FIGS. 5 and 6, for the conventional and the new configuration respectively. In FIGS. 5 and 6, the vertical axis of the diagram represents flow velocities in centimeters per second and the horizontal axis represents slot width at the discharge end of the slot in centimeters. The calculations shown in these diagrams are based on screening gaps or slot widths of 0.008 inches (0.020 centimeters). From the velocity profile, the flow rate and the average velocity through each slot has been calculated.

Surprisingly, the difference in flow rate obtained with the conventional verses the new configuration profile is very great i.e. 0.61 m/sec for the conventional and approximately 6.0 m/sec for the new profile. It is noteworthy that the velocity in the new profile is nearly identical to the ideal flow velocity which would result from the pressure differential of 3.2 psi. which was applied in both cases.

We cannot fully explain the difference of flow velocity of the two profiles since coefficients of flow through very smooth and very sharp cornered orifices do not differ as much. Possibly the remaining difference is due to the vortex flow configuration in the inlet groove 28. The comparison of the velocity profiles under identical conditions except for the change from a conventional angular type screen wedge wire to the wedge wire element of this invention demonstrates the lower resistance to flow and the approved efficiency of the wedge wire and a wedge wire screen made according to this invention.

What is claimed is:

1. A wedge wire screen element configured to cooperate with adjacent wedge wire screening elements in a wedge wire type screen cylinder to define a screening slot between each said adjacent wedge wire screen element for screening or sorting a suspension of papermaker's stock, said wedge wire screen element comprising:

a body having a head defining an inlet side for said wedge wire type screen cylinder, said head including an inclined upstream surface and an inclined downstream surface, said upstream surface being planar and inclined between 20–40° with respect to a reference line through said slot and said downstream surface being planar and inclined between 40–80° with respect to said reference line, an upstream sidewall, a downstream sidewall, and a bottom wall, said upstream sidewall connecting said inclined upstream surface of said head to said bottom wall, said downstream sidewall connecting said inclined downstream surface of said head to said bottom wall, said upstream sidewall and said downstream sidewall converging in relation to each other from said head to said bottom wall, said inclined upstream surface of said head being joined to said upstream sidewall at a first radius that does not form a protuberance, said inclined downstream surface of said head being joined to said downstream sidewall at a second radius defining a protuberance, said first and second radii located on a line orthogonally related to said reference line.

2. A wedge wire screen element as recited in claim 1 further comprising a third radius having a reverse curvature relative to said second radius, said third radius positioned intermediate said second radius and said downstream sidewall.

* * * * *